United States Patent [19]

Hale et al.

[11] Patent Number: 4,634,845
[45] Date of Patent: Jan. 6, 1987

[54] PORTABLE PERSONAL TERMINAL FOR USE IN A SYSTEM FOR HANDLING TRANSACTIONS

[75] Inventors: William J. Hale; William R. Horst, both of Dayton; Ellen P. Riley, Centerville, all of Ohio

[73] Assignee: NCR Corporation, Dayton, Ohio

[21] Appl. No.: 685,622

[22] Filed: Dec. 24, 1984

[51] Int. Cl.$^4$ ............................................. G06K 5/00
[52] U.S. Cl. ....................................... 235/350; 235/379
[58] Field of Search .................................... 235/379, 380

[56] References Cited

U.S. PATENT DOCUMENTS

| | | | |
|---|---|---|---|
| 3,971,916 | 7/1976 | Moreno | 235/61.7 |
| 4,004,133 | 1/1977 | Hannan et al. | 235/487 |
| 4,017,848 | 4/1977 | Tannas, Jr. | 350/334 |
| 4,053,735 | 10/1977 | Foudos | 235/419 |
| 4,092,524 | 5/1978 | Moreno | 235/419 |
| 4,211,919 | 7/1980 | Ugon | 235/487 |
| 4,277,837 | 7/1981 | Stuckert | 235/379 |
| 4,298,793 | 11/1981 | Melis et al. | 235/487 |
| 4,313,108 | 1/1982 | Yoshida | 350/331 |

FOREIGN PATENT DOCUMENTS 0029894 of 0000 European Pat. Off. .
2066540 of 0000 United Kingdom .

*Primary Examiner*—Harold I. Pitts
*Attorney, Agent, or Firm*—Wilbert Hawk, Jr.; Albert L. Sessler, Jr.; Elmer Wargo

[57] ABSTRACT

A system including a portable personal terminal which may be used for handling a wide variety of financial, shopping, and other transactions. The personal terminal is credit-card sized, is intelligent, includes a plurality of transaction totals and is constructed to be user friendly. An interface module is used to couple the terminal to other systems for on line uses.

17 Claims, 27 Drawing Figures

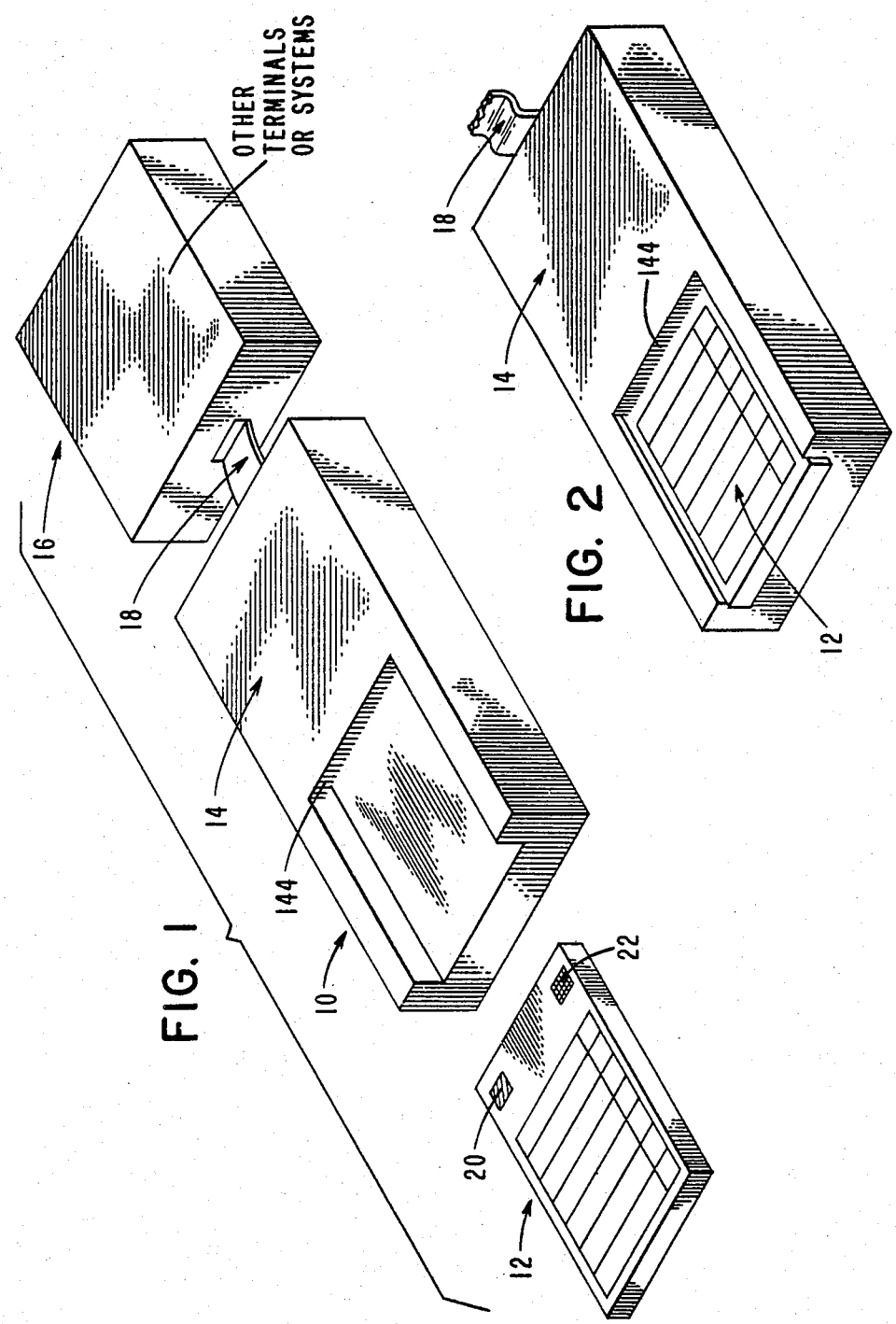

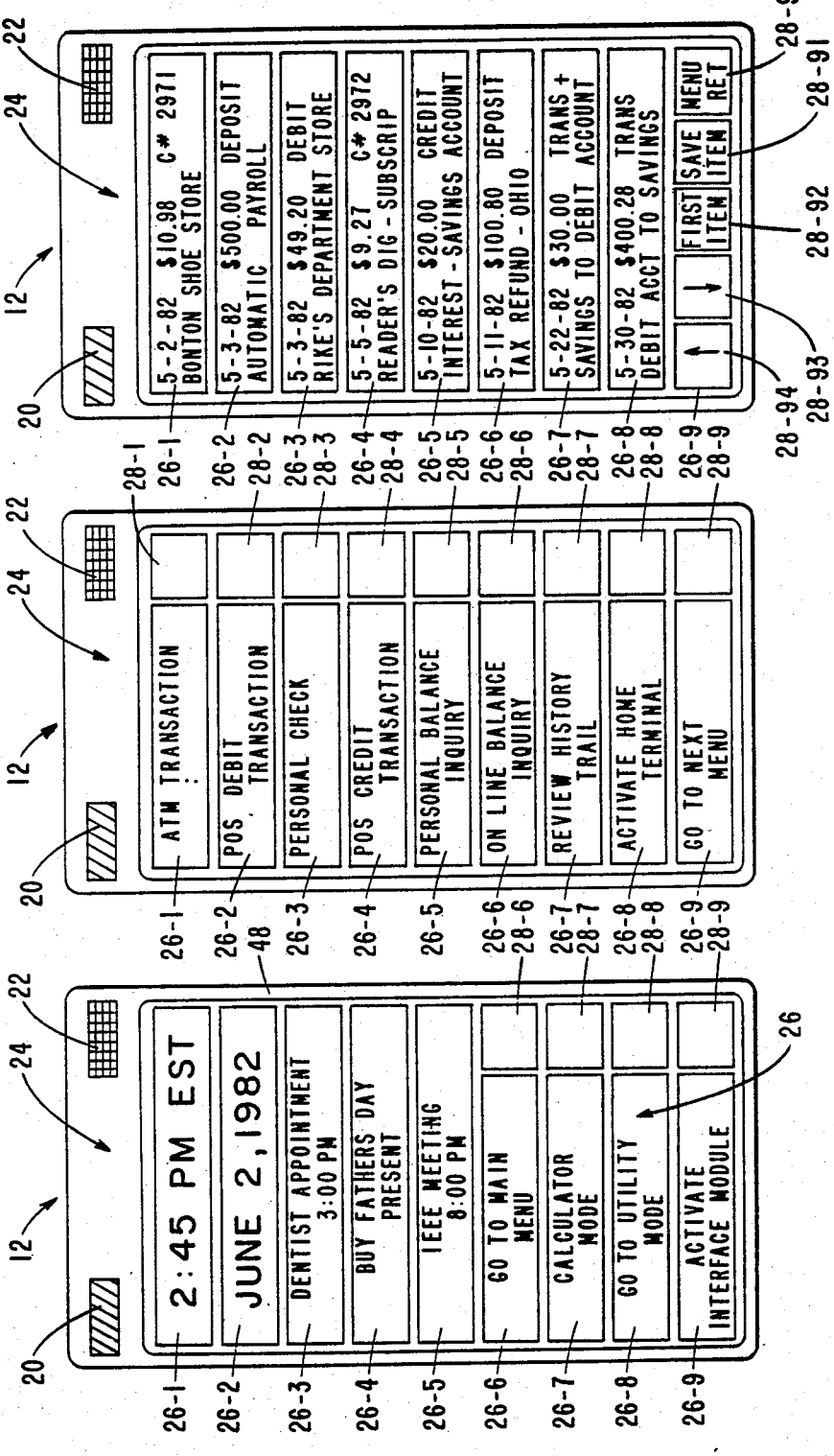

FIG. 16

| TRANSACT | 1 |
|---|---|
| ATM – CKG | * |
| ATM – SAV | * |
| ATM – PAY | * |
| HOME CHG | * |
| HOME SAV | * |
| HOME PAY | * |
| MORE | * — 28-8 |
| RETURN | * |

FIG. 17

| TRANSACT | 2 |
|---|---|
| POS – STD | * — 28-1 |
| POS – GAS | * |
| POS – CLB | * |
| VISA | * |
| CHECKBOOK | * |
| PREV PAGE | * |
| RETURN | * |

FIG. 18

POS – STD

ENTER PIN ON KEYBOARD — 26-2
PRESS ACCEPT OR CLEAR

| | 1 OZ | 2 ABC | 3 DEF | |
| | 4 GHI | 5 JKL | 6 MNO | |
| | 7 PRS | 8 TUV | 9 WXY | |
| | | 0 | | |

| ACCEPT | * — 28-7 |
| CLEAR | * |
| CANCEL | * |

FIG. 19

POS – STD

WELCOME TO FOODTOWN — 26-2
7-19-83    4:45 PM

| | 1 OZ | 2 ABC | 3 DEF | |
| | 4 GHI | 5 JKL | 6 MNO | |
| | 7 PRS | 8 TUV | 9 WXY | |
| | | 0 | | |

| ACCEPT | * |
| CLEAR | * |
| CANCEL | * |

FIG. 20

| POS – STD |
| AMT OF SALE |
| 36.75      CH | — 26-3
| ACCEPT CH | * | — 28-4
| ADJUST CH | * | — 26-5
| CANCEL | * |
|  | — 26-6

FIG. 21

| POS – STD |
| 36.75      CH |
|  |
| PAY FROM | — 28-5
| CHECKING | * |
| SAVINGS | * |
| STOR ACCT | * |
| VISA | * |
| CANCEL | * |

FIG. 22

| POS – STD |
| 36.75      CH | — 26-2
| CURRENT CHECKING BALANCE<br>7-19-83 LAST #479  342.15 | — 26-3
| CHECKING BALANCE AFTER<br>THIS TRANSACTION  305.40 | — 26-4
|  |
|  |
|  | — 26-8
| ACCEPT | * | — 28-8
| CANCEL | * |

FIG. 23

| POS – STD |
| 36.75      CH |
|  |
|  |
| 7-19-83 FOODTOWN  36.75 CH<br>OKING TRANS #480 GROCERY | — 26-5
| SYST #5753 TERMINAL #0081<br>FOODTOWN RIVER RD  4:46 PM | — 26-6
| PLEASE | — 26-7
| REMOVE YOUR | — 26-8
| P TERMINAL | — 26-9

FIG. 24

| HOME – PAY | |
|---|---|
| 52.00 CR | |
| PAY FROM | |
| CHECKING | * |
| SAVINGS | * |
| VISA | * |
| CANCEL | * |
| | |
| | |

FIG. 25

| HOME – PAY | |
|---|---|
| 52.00 CR | |
| CURRENT VISA BAL. 7-19 #2778-792-833 245.78 | |
| VISA ACCT. BALANCE AFTER THIS TRANSACTION 297.78 | |
| | |
| | |
| | |
| ACCEPT | * |
| CANCEL | * |

FIG. 26

| HOME – PAY | |
|---|---|
| 52.00 CR | |
| | |
| 7-19-83 RIKE'S 52.00 CR VISA TRANS #092 ON ACCT | |
| RBA #236-72-4915 7-25-83 VISA #2778-792-457-833 | |
| SYST #7241 TERMINAL #02 RIKE'S DOWNTOWN 7:34 PM | |
| CONTINUE | * |
| QUIT | * |
| | |

FIG. 27

| SYS. ON LINE | |
|---|---|
| FIRST BANK | |
| PLEASE PAY = | |
| FIRST BANK HOME MORTGAGE LOAN | * |
| FIRST BANK HOME IMPROVE/AUTO LOAN | * |
| COLUMBIA GAS AND ELECTRIC COMPANY | * |
| MIDWESTERN BELL TELEPHONE COMPANY | * |
| MORE | * |
| CANCEL | * |

# PORTABLE PERSONAL TERMINAL FOR USE IN A SYSTEM FOR HANDLING TRANSACTIONS

This application is related to "System For Handling Transactions Including A Portable Personal Terminal", which is filed on the same date and assigned to the same assignee as is this application.

BACKGROUND OF THE INVENTION

This invention relates to a pocket-sized, portable, personal terminal unit which may be used in a system for handling a wide variety of financial, shopping, and other transactions.

In recent years there has been a trend to automate financial, shopping, and bill-paying transactions and to eliminate bank checks by providing automatic cash dispensing terminals and by providing "debit" credit cards, for example.

One of the problems associated with the use of financial or transaction terminals is that they tend to "frighten" or overwhelm users who are not too sophisticated in the use of such terminals. Another problem is that users are required to operate several different terminals or are required to carry several credit or debit cards to carry on their transactions. For example, the following is a general list of different ways of handling financial transactions:

1. Automated Teller Machine (ATM) cash deposits and/or withdrawals;
2. Personal checks;
3. Bill paying by telephone;
4. Point of Sale (POS) debit payments; and
5. Credit transactions.

SUMMARY OF THE INVENTION

In contrast with the above, the present invention provides a "user-friendly", pocket-sized device or terminal for use in a system for unifying the handling of the above recited financial transactions along with certain personal activities of a user of the system. The term "user-friendly" means that sufficient lead-through instructions, for example, are provided to the user of the terminal to enable an average user to operate the terminal without difficulty.

This invention relates to a data handling device comprising: a panel; a plurality of discrete display elements arranged relative to said panel to present, when selectively energized, user instructions and key information to a user of said device; said discrete display elements being small in size to enable said user instructions and key information to be presented over substantially all of said panel; a plurality of discrete switches for entering data when actuated; said discrete display elements and said discrete switches being positioned in overlapping relationship relative to said panel to enable said switches to be actuated from said panel; control means for controlling the operation of said device including said discrete display elements and said discrete switches so as to facilitate the displaying and entry of data; said control means comprising: means for storing data and a plurality of machine instructions; and means for executing said machine instructions including means for selectively energizing said display elements so as to present on said panel that key information and those of said user instructions which are associated with those of said discrete switches which are to be used in association with said machine instructions being executed so as to present to said user a variable user instruction format and a variable key format which are a function of said machine instructions being executed as said machine instructions are executed so as to facilitate the entry of data; and said device also including means for transferring data between said device and a second data handling device.

The advantages of this invention will be more readily understood in connection with the following description, claims and drawing.

BRIEF DESCRIPTION OF THE DRAWING

FIG. 1 is a schematic showing, in perspective, of a system which includes a portable, personal terminal of this invention, and an interface module which couples the personal terminal to other terminals or systems;

FIG. 2 is a schematic showing, in perspective, of the personal terminal shown in FIG. 1 being coupled to its associated interface module;

FIG. 3 is a plan view of the personal terminal when it is in an "initial" mode of operation;

FIG. 4 is a plan view of the personal terminal showing another mode of operation with a portion of the functions available on its main menu;

FIG. 5 is a plan view of the personal terminal showing a review of the transactions associated with the user's bank account;

FIG. 16 is a schematic diagram showing only the display and key areas associated with the personal terminal shown in FIG. 1;

FIGS. 17, 18, and 19 are schematic diagrams similar to FIG. 16 showing different messages displayed on the personal terminal in performing a transaction;

FIGS. 20 and 21 are schematic diagrams similar to FIG. 16 showing the options presented to a user in paying for a point of sale transaction;

FIG. 22 is a schematic diagram similar to FIG. 21 showing a different display presented on the personal terminal to a user in performing a transaction;

FIG. 23 is a schematic diagram showing a history trail for the transaction completed in FIG. 2;

FIGS. 24, 25 and 26 are schematic diagrams showing different displays and options presented in a "Home Paying" transaction while using the personal terminal shown in FIG. 1; and FIG. 27 shows a schematic diagram of the display of the personal terminal when it and the interface module are used in an on line system for making home payments.

DETAILED DESCRIPTION OF THE INVENTION

Figure 6:
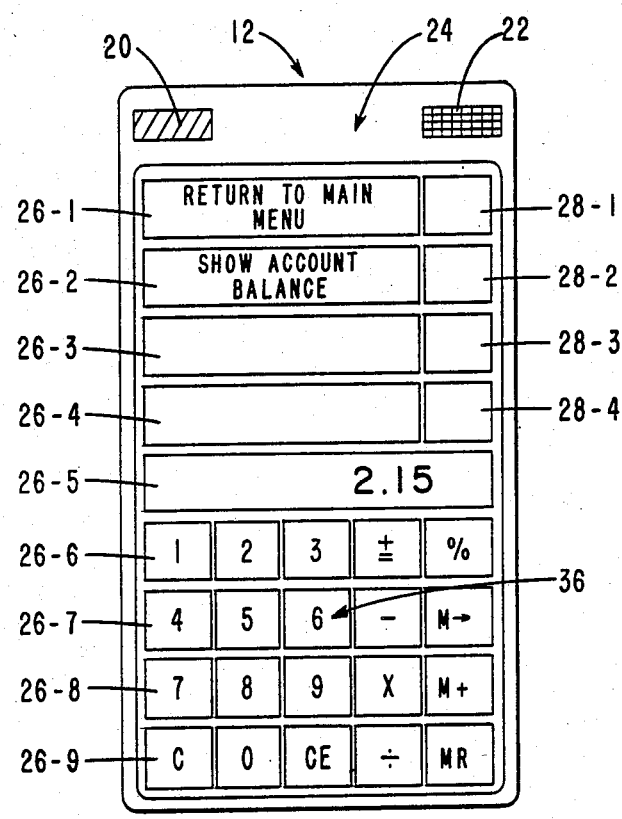
FIG. 6 is a plan view of the personal terminal showing the terminal in a calculator mode.

FIG. 1 shows a system 10 which includes a portable, pocket-sized, personal terminal 12 (which shall be referred to hereinafter as P Terminal 12), an interface module 14 (which shall be referred to hereinafter as I Module 14), and other terminals or systems 16 which shall be referred to hereinafter as Systems 16. Systems 16 represents a plurality of different terminals or systems which will be disclosed hereinafter. For the moment, it is sufficient to state that the I Module 14 provides the coupling or interfacing between the P Terminal 12 made according to this invention and the Systems 16. The I Module 14 is coupled to the Systems 16 by a conventional connection 18 which includes couplings and coupling techniques which are appropriate to the specific Systems 16.

Before discussing the various elements of the system 10 in detail, it appears appropriate to discuss their various functions and attributes in a general way. In this regard, the P Terminal 12:

1. Is credit-card sized for easy portability;
2. Is personalized to the individual customer using it;
3. Is utilized by the customer for performing business and financial transactions at point of sale machines, at ATM's, and at the customer's home, for example;
4. Is utilized by the customer for ascertaining balances in checking or savings accounts and for many other transactions;
5. Is utilized by the customer as a "memo" reminder; and
6. Is battery powered.

As previously stated, the I Module 14 serves as an interface between the P Terminal 12 and the Systems 16. Some of the functions or attributes of the I Module 14 in various combinations are as follows:

1. It is used to dial a network telephone line.
2. It is used optionally to couple the P Terminal 12 to a:
   a. Television set or video monitor;
   b. Alphanumeric keyboard; and
   c. Printer, for example.
3. It can be used in conjunction with a personal computer enabling the computer to be employed as a personal financial terminal, and also enabling the computer to initiate telephone connections to financial institutions for providing authorization or data exchange.
4. It can be used to couple the P Terminal 12 to banks or store terminals.
5. The communications between the P Terminal 12 and the I Module 14 are carried on by an optical coupling. This connection reduces noise, eliminates the precise tolerances necessary when using mechanical electrical connectors, and minimizes the electrical power consumption in the P Terminal 12.

Additional features and functions of the P Terminal 12 and the I Module 14 will become apparent as specific details of these elements are described hereinafter.

FIG. 2 shows how the P Terminal 12 is coupled to the I Module 14 for use therewith. A light modulator area 20 in FIG. 1 (for transmitting data) and a light detector area 22 (for receiving data) are used to optically couple the P Terminal 12 to the I Module 14 when the two are in the assembled relationship shown in FIG. 2; this aspect will be discussed hereinafter.

FIG. 3 shows a plan view of the P Terminal 12 when it is in an "initial" mode of operation. The P Terminal 12 is shown slightly larger than full size in FIG. 3, which size is about equal to that of a credit card; the P Terminal 12 is less than ¼ inch thick in the embodiment described. The P Terminal 12 has a semi-flexible, top panel 24 which functions as both a display and a keyboard. When viewing the top panel 24 as a display, there are display elements or pixels which are distributed over the panel 24 in a pattern that is appropriate to display information to the user. The panel can be viewed as having nine line displays 26-1 through 26-9 which will be collectively referred to as display 26. A single string of large alphanumerics can be displayed in a line display like 26-1, or a double string of smaller alphanumerics can be displayed in a line display like 26-3.

Figure 7:
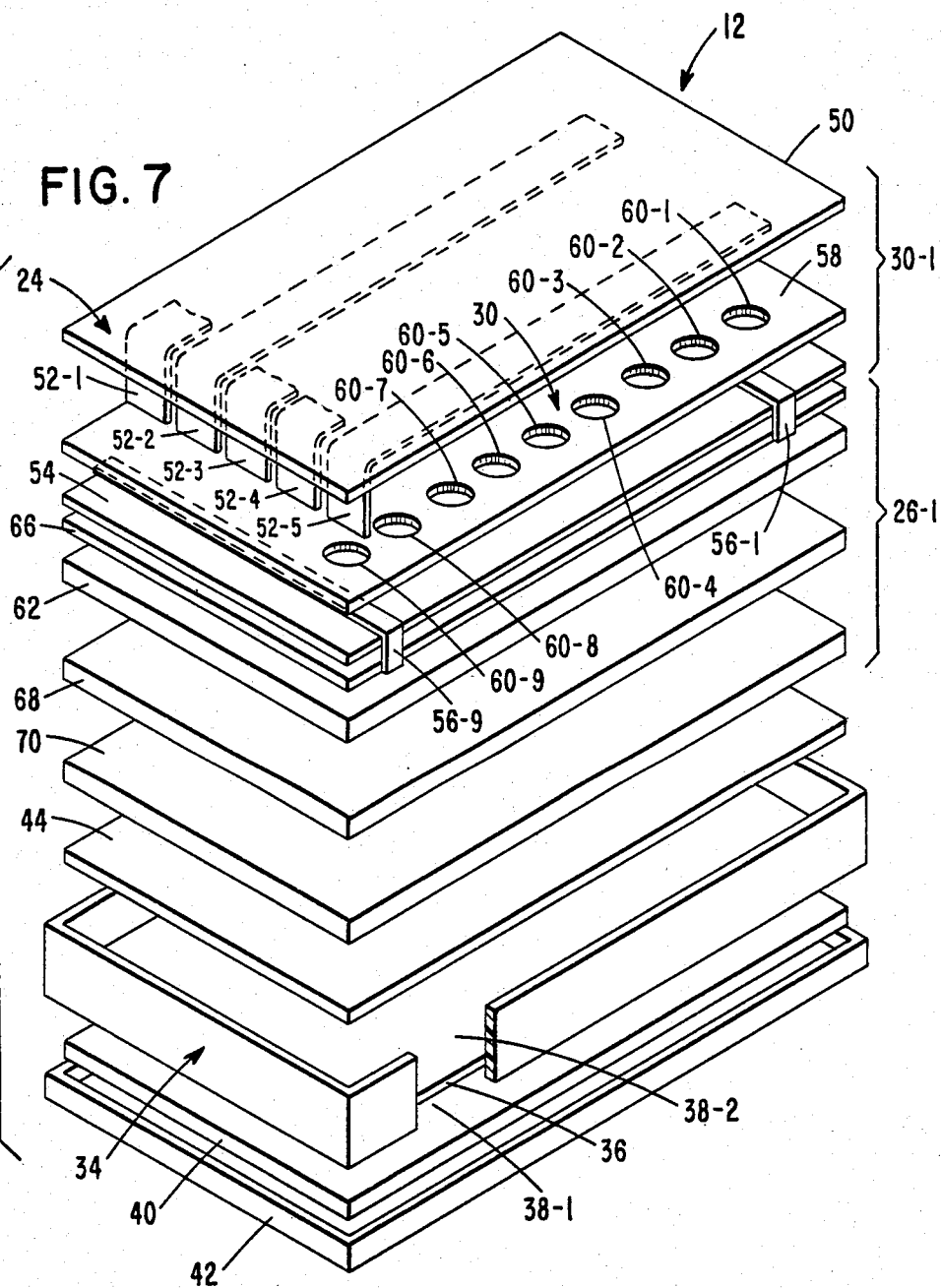
FIG. 7 is an exploded view, in perspective, of the components of the terminal shown in FIG. 1.

A feature of the preferred embodiment of P Terminal 12 is that the display 26 consists of a homogeneous, non-segmented matrix of display pixels which are selectively energized to produce different data and to highlight certain key areas as a sequence of operations progresses. For example, FIG. 3 shows the P Terminal 12 in the "initial" condition, in which line displays 26-1 and 26-2 contain the time and date, respectively; display lines 26-3 through 26-5 contain certain memos or reminders as precisely entered by the user; and display lines 26-6 through 26-9 contain certain options which are available to the user at this time. Notice that each of the display lines 26-6 through 26-9 has a key area 28-6 through 28-9, respectively, which is highlighted or outlined by the display 26 to enable the user to make a selection by actuating the associated key area. The top panel 24 has a plurality of switches 30 positioned relative to the top panel 24 as shown in FIG. 7. When a particular switch of the plurality of switches 30 is to be involved in one of the choices which is to be made available to the user, the associated switch area on the top panel 24 will be visually outlined by the display 26 to make this choice apparent to the user. The switches used in the P Terminal 12 are of the "micromotion" type and are integrated with the display 26 as will be described hereinafter.

Continuing with the example shown in FIG. 3, suppose a user of the P Terminal 12 wished to "Go To the Main Menu". In this situation, the user would depress key area 28-6, and thereafter, the P Terminal 12 would present the selections shown in FIG. 4, as an example. Notice that each of the options presented on line displays 26-1 through 26-9 of the main menu in FIG. 4 has a key area 28-1 through 28-9, respectively, associated therewith. Notice also that line display 26-9 presents the option of going to the next menu (not shown) to present additional options to the user.

Continuing with the example shown in FIG. 4, suppose the user of the P Terminal 12 wishes to select the option presented by line display 26-7. In this situation, the user would depress the key area 28-7 to obtain "Review History Trail", which is essentially a review of the transactions recorded against this account, and this review of transactions is shown, as an example, in FIG. 5. There are five active key areas presented in FIG. 5, and these key areas are 28-9, 28-91, 28-92, 28-93, and 28-94. Notice that each key area has an identifier associated therewith. Key areas 28-94 and 28-93 are used as up-down arrows to move or "scroll" the contents of the line displays if the prior transactions exceed the eight lines of the display. The key area 28-92 is used to reset the list of transactions to the "first" eight items within a transaction period, or alternatively, this key area could be programmed by the P Terminal 12 to reset the list of transactions to the "last" eight items within the period. The key area 28-91 marked "Save" allows a particular transaction to be carried forward into the next transaction or accounting period. The key area 28-9, when actuated, returns the display 26 to the main menu shown in FIG. 4.

When looking at the initial state of the P Terminal 12 shown in FIG. 3, if the user had wished to select the "Calculator Mode" instead of the "Menu" as just described, the user would have actuated the key area 28-7 shown in FIG. 3. When the key area 28-7 is actuated, the P Terminal 12 becomes partially, a conventional, full-function calculator as shown in FIG. 6. The P Terminal 12 (FIG. 6) has the arithmetic and memory keys shown on line displays 26-6 through 26-9, with the answer line being shown on line display 26-5. Notice that the keys are outlined by the display 26, and each key has its own designation thereon. In the embodiment described, there are four key areas 28-1 through 28-4 which can be used in addition to those employed in the calculator which is designated generally as 36. The key areas 28-2 through 28-4 can be actuated to obtain certain balances stored in the P Terminal 12, or the key area 28-1 can be used to return to the Main Menu.

In the embodiment described, the number of switches included in the P Terminal 12 is 45, with five switches being included in each of the nine line displays 26-1 through 26-9; naturally, this number could be varied to suit particular applications. It should also be noted that the key areas themselves have no captions or labels on them in the usual sense. The labels or designations are provided by the display 26 which lies below the plurality of switches 30. While the actual (physical) switches in the plurality of switches 30 are always present on the top panel 24, they are outlined or highlighted only when they become necessary for a particular function or instruction being executed by the P Terminal 12. FIGS. 3-6 illustrate a few of the uses of the P Terminal 12 while it exists by itself without being connected to the I Module 14.

Before proceeding further with a discussion of the operation of the P Terminal 12, it appears appropriate to discuss the construction details of this terminal itself. As previously stated, the P Terminal 12 is about the size of a credit card and is less than ¼ inch thick in the embodiment described.

The P Terminal 12 is shown in perspective, in an exploded view, and in exaggerated size in FIG. 7 to facilitate a showing of the various components included in the terminal. The P Terminal 12 includes a frame member 34 which is divided by the planar support 36 to provide a lower compartment 38-1 and an upper compartment 38-2. A conventional, sheet battery 40, which powers the P Terminal 12, is positioned in the lower compartment 38-1 and retained therein by a removable bottom cover 42 which is conventionally and detachably secured to the frame member 34 to facilitate the replacement of the battery 40.

The upper compartment 38-2 contains those elements included in the plurality of switches 30 and they are included in the bracket 30-1 in FIG. 7. Similarly, those elements included in the display 26 are included in the bracket 26-1. The P Terminal 12 also includes a printed circuit board 44 which contains a microprocessor 46 (FIG. 8) and associated circuitry to be described hereinafter. The printed circuit board 44 and those elements included in brackets 26-1 and 30-1 are retained in the upper compartment 38-2 by a conventional Bezel frame 48 (FIG. 3) which is detachably secured to the frame member 34. The plurality of switches 30 included in the bracket 30-1 lies above the display 26 included in bracket 26-1; however, the plurality of switches 30 is essentially transparent to permit the display 26, when energized, to be visible through the switches 30.

The plurality of switches 30 included in the bracket 30-1 in FIG. 7 is comprised of a top, transparent, flexible, plastic-film layer 50 such as Mylar which is a trademark of E. I. DuPont de Nemours and Company of Delaware. The lower side of layer 50 has five, equally-spaced, transparent strips or conductors 52-1, 52-2, 52-3, 52-4, and 52-5 deposited thereon as shown. In the embodiment described, the conductors 52-1 through 52-5 are each approximately 0.4 inches wide and are spaced apart on 0.5 inch centers, although other dimensions may be employed.

The plurality of switches 30 (FIG. 7) also includes a thin, bottom, transparent, plastic-film layer 54, and this layer has nine equally-spaced, transparent strips or conductors 56-1, 56-2, 56-3, 56-4, 56-5, 56-6, 56-7, 56-8, and 56-9 deposited on the top surface of layer 54, with only conductors 56-1 and 56-9 being shown in FIG. 7 in order to simplify the drawing. A spacer layer 58 is positioned between the top layer 50 and the bottom layer 54 to provide insulation between the conductors 52-1 through 52-5 and the conductors 56-1 through 56-9. The layer 58 has a plurality of holes therein, with each hole being located at an intersection between one of the conductors 52-1 through 52-5 and one of the conductors 56-1 through 56-9. For example, only holes 60-1, 60-2, 60-3, 60-4, 60-5, 60-6, 60-7, 60-8, and 60-9 are shown in FIG. 7 to simplify the drawing; however, the entire array can be visualized from the fact that hole 60-1 is aligned with the intersection of conductor 52-5 and conductor 56-1, and similarly, hole 60-9 is aligned with the intersection of conductor 52-5 and conductor 56-9. The switch areas 28-1 through 28-9, alluded to with regard to the discussion of FIG. 4, are aligned, respectively, with holes 60-1 through 60-9 shown in FIG. 7. When a user wishes to actuate one of the plurality of switches 30, as for example that one associated with key area 28-9 in FIG. 4, the user simply depresses that area 28-9 causing the conductor 52-5 in FIG. 7 to pass through the hole 60-9 and thereby contact the conductor 56-9. The key area 28-9 is outlined by the display 26 positioned beneath (as viewed in FIG. 7) the plurality of switches 30 as will be described hereinafter. A transparent, glass substrate 62 provides a rigid backup plate for the layers 50, 54, and 58 associated with the plurality of switches 30. The conductors 52-1 through 52-5 and the conductors 56-1 through 56-9 comprise the keyboard array 64 shown schematically in FIG. 8, and the ends of these conductors are connected to the printed circuit board 44 by conventional connectors or "plated through holes" (not shown). Although the fabrication of switches 30 has been described in a specific manner, it is not intended to exclude other alternative methodologies to fabricate "transparent" switches such as homogeneous or discrete capacitive-film switches and electrostatic-sensitive switches, for example.

The glass substrate 62 alluded to forms a part of the display 26 whose members are included in the bracket 26-1 shown in FIG. 7. In the embodiment described, the display 26 is of the liquid crystal type. The major members of the display 26 shown in bracket 26-1 also include an optical polarizer 66, liquid crystal material 68, and a lower support glass substrate 70. The side of the glass substrate 62 which faces the liquid crystal material 68 has a common electrode or conductor 71 extending over the entire area of the substrate. The common electrode 71 is shown schematically in FIG. 10, but is not shown in FIG. 7. Correspondingly, the side of the glass substrate 70 which faces the liquid crystal material 68 has a plurality of electrodes or pixels (PIX.) like 72 and 74 (FIG. 9) thereon. These pixels (picture elements) like 72 and 74 are selectively energized by the display circuit 76 (FIG. 9) to produce the highlighting of key areas like 28-1 through 28-9 shown in FIG. 4, for example, and the various alphanumerics and symbols displayed on the P Terminal 12. In the embodiment described, there are about 20,000 pixels like 72 and 74 in the display 26. The liquid crystal material 68 is sealed between the substrates 62 and 70.

Figure 9:
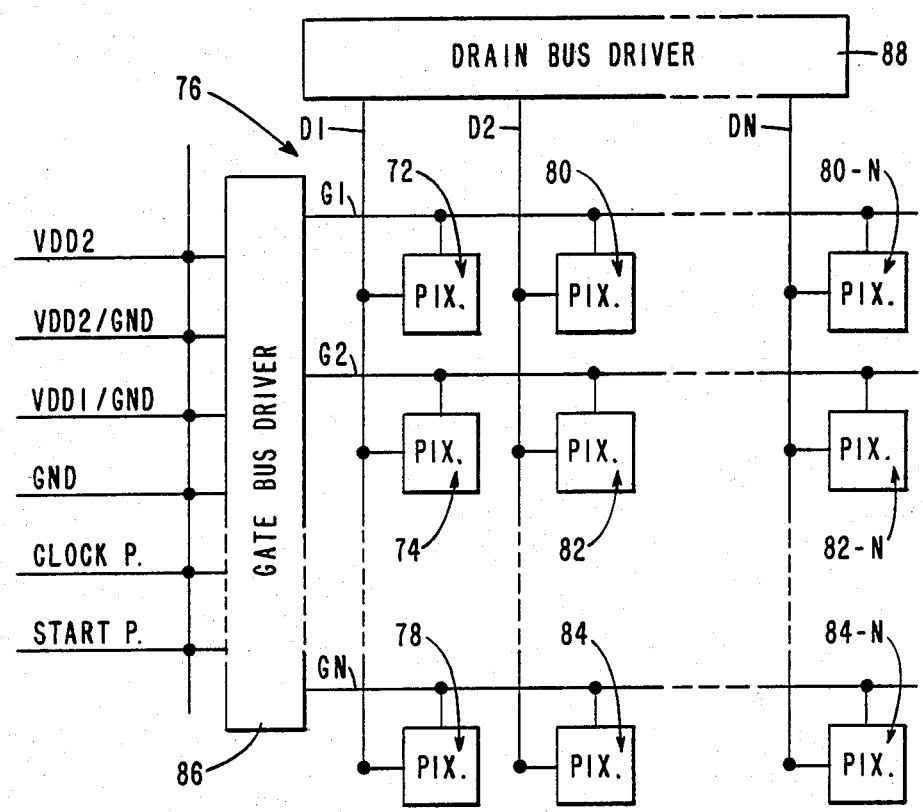
FIG. 9 is a schematic diagram showing a display circuit which is used to energize particular electrodes to produce the desired patterns or characters on the display of the personal terminal shown in FIG. 1.
Figure 10:
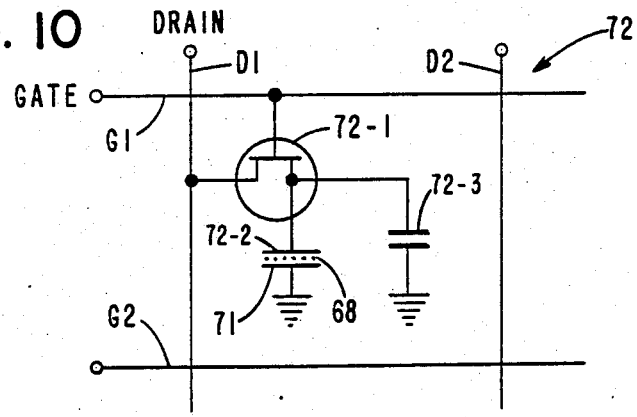
FIG. 10 is a schematic circuit for energizing a single electrode of many such electrodes associated with the display on the personal terminal shown in FIG. 1.
Figure 11:
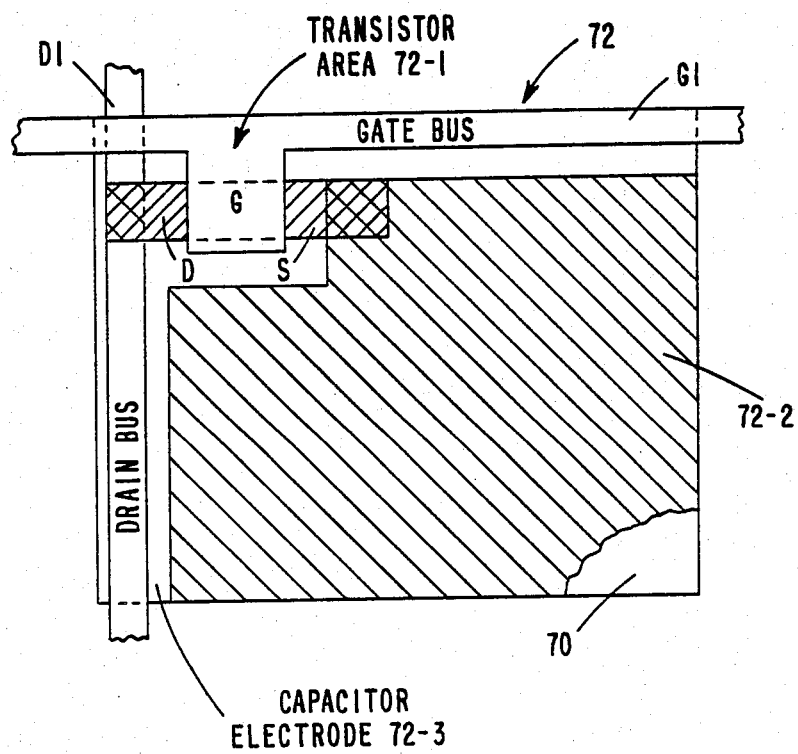
FIG. 11 is a schematic diagram showing a greatly-enlarged, single electrode or pixel associated with the display of the personal terminal.

The pixel 72, shown within the display circuit 76 (FIG. 9), is shown in more detail in FIGS. 10 and 11. The pixel 72 (abbreviated PIX. in FIG. 9) is fabricated by thin-film, transistor technology on the glass substrate 70. The pixel 72 includes the thin film transistor 72-1 having its drain (D) connected to a drain bus (D1) and its gate (G) connected to the gate bus G1. The source (S) of the transistor 72-1 is connected to the electrode 72-2 which has the general shape of a quadrilateral as shown in FIG. 11. The liquid crystal material 68 lies between the common electrode 71 and the electrodes, like 72-2, of the pixels included in the display 26. Each pixel, like 72 for example, has a thin film capacitor 72-3 whose positive plate is connected to the source (S) of the transistor 72-1 (FIG. 10), with the remaining plate being connected to ground. In the embodiment described, when the gate of transistor 72-1 is grounded, current flows through the transistor to place a positive potential on the electrode 72-2 and the capacitor 72-3 causing the area between the electrode 72-2 and the common electrode 71 to be highlighted as previously described. The capacitor 72-3, after being charged, is used to maintain the charge on the electrode 72-2 until the next subsequent energization by the display circuit 76 shown in FIG. 9.

Figure 8:
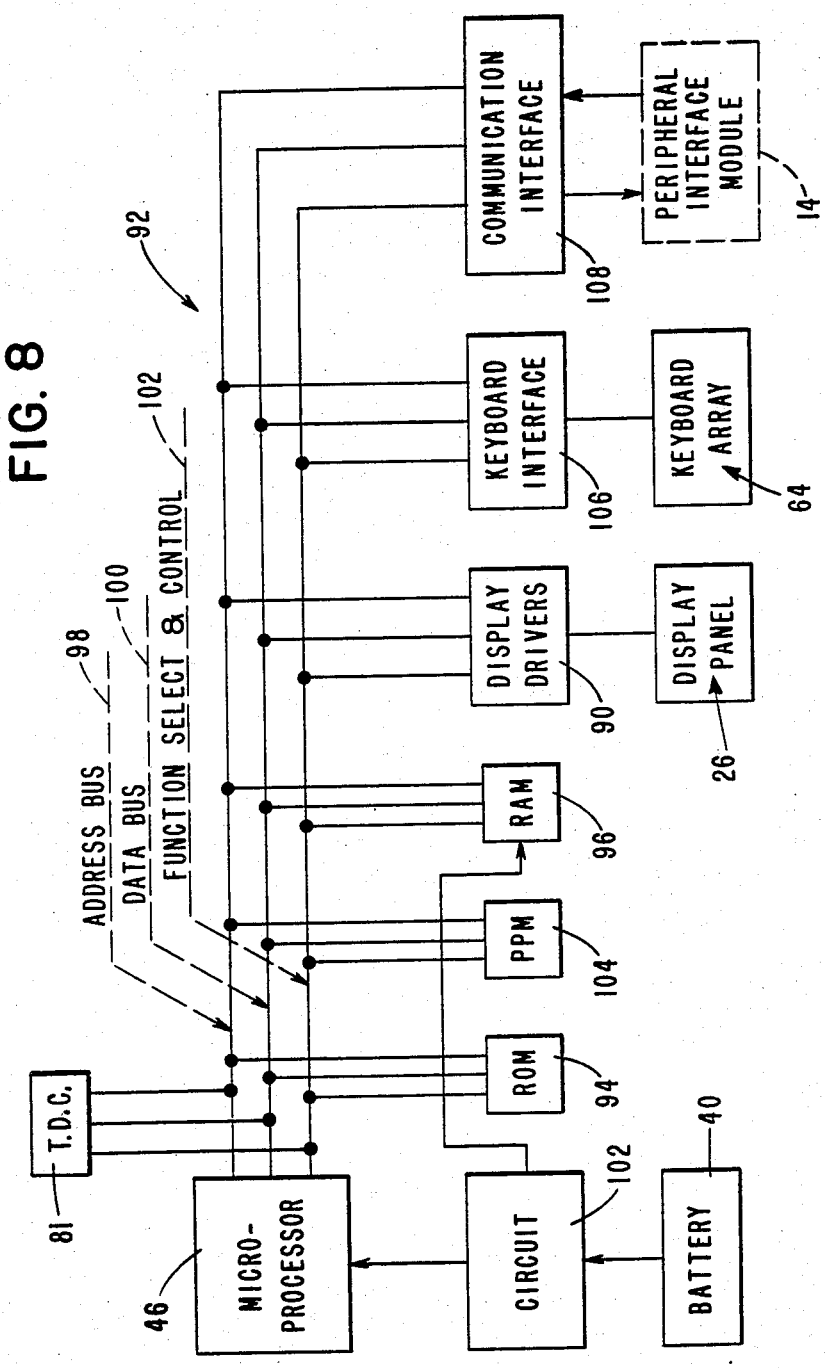
FIG. 8 is a schematic block diagram showing the means for controlling the operation of the personal terminal shown in FIG. 1.

As previously stated, the display 26 is comprised of a matrix of pixels like 72, 74, 80, 82, 84, 80-N, 82-N, and 84-N as shown in the display circuit 76 (FIG. 9). The circuit 76 is conventional and includes a gate bus driver 86 and a drain bus driver 88. The drivers 86 and 88 are shown collectively as display drivers 90 shown in FIG. 8. The VDD2, VDD2/GND, VDD1/GND, GND, CLOCK P. and START P. signals are conventional as shown in the *Conference Record* mentioned hereinafter, and are fed into the gate bus driver 86 to conventionally address the pixels selected by the microprocessor 46. There are conventional, corresponding signals (not shown) fed into the drain bus driver 88 to complete the selection of pixels by the microprocessor 46.

When a particular pixel, such as 72 shown in FIG. 10, is energized, the liquid crystal material 68 between the associated electrode 72-2 and the common electrode 71 is polarized by the application of voltage across these electrodes. The optical polarizer 66 (FIG. 7) is used to enable the user to distinguish between polarized and non-polarized light as is done conventionally. In the embodiment described, the pixels are made to appear black to a user of the P Terminal 12 when the pixel is made active. The particular patterns, key areas and alphanumeric displays shown on display 26 are controlled by the microprocessor 46.

As previously stated, there are about 20,000 active pixels, like 72 and 74 (FIG. 9) in the display 26 in the preferred embodiment of the P Terminal 12 being described. The techniques for forming and operating such displays are described in detail in the publication, *Conference Record of* 1980 *Biennial Display Research Conference For Information Display (S.I.D.)*. Gate and source leads of each transistor like 72-1 in FIG. 10 are connected to the "x" and "y" address lines to two on-board, thin-film, shift-register drivers like gate bus driver 86 and drain bus driver 88, causing the individual pixels in the display 26 to be scanned and selectively energized in accordance with the associated input signals.

FIG. 8 shows the means for controlling the P Terminal 12 which includes the circuit 92 and the microprocessor 46 already alluded to. The microprocessor 46 functions as the main source of control and initiator of events. The microprocessor 46 fetches instructions from the read only memory (ROM) 94 and executes these instructions in sequence to perform the functions which are expected of the P Terminal 12. In addition to specifying locations in ROM 94 and the random access memory (RAM) 96, the microprocessor 46 determines the flow of data to and from the other elements of the circuit 92 via the address bus 98, data bus 100, and function select and control lines 102. In one typical implementation of the embodiment described, the data bus 100 is eight bits wide and the address bus 98 is sixteen bits wide. The timing and bus driver circuits are not shown in FIG. 8; however, they are conventional. The microprocessor 46 and the majority of the remaining elements shown in FIG. 8 are fabricated in CMOS technology so as to minimize the power requirements on the sheet battery 40. The battery 40 is connected to the rest of the circuit 92 through a battery system circuit 102 (connections not shown) which contains the necessary capacitors (not shown) to provide voltage to the memories in the circuit 92 during the time that sheet battery 40 is being replaced and to maintain data in the RAM 96.

The ROM 94 (FIG. 8) contains the stored programs and instructions to be executed during the operation of the P Terminal 12, and to be used for displaying the specific formats and messages on the display panel 26. The particular programs and instructions within the ROM 94 are determined by the issuer of the P Terminal 12 at the time of manufacture of the ROM 94. Typical programs which may be included in the ROM 94 are:

(1) Bill paying through a home computer;
(2) Paying for a purchased item at the point of sale; and (3) Withdrawing money from an ATM, to name a few examples. These examples will be discussed in detail hereinafter.

The circuit 92 (FIG. 8) also includes a permanent programmable memory (PPM) 104 which is written or programmed at the time the P Terminal 12 is issued to a user; the contents of this memory cannot be changed after it is written into. The use of the PPM 104 enables the P Terminal 12 to be "customized" to satisfy the requirements of an individual user. The circuit 92 also includes a keyboard interface 106 which couples the keyboard array 64 to the address and data bus lines 98 and 100, respectively, and the function select and control lines 102. The keyboard interface 106 includes a set of drivers (not shown) to scan the rows of switches in the keyboard array 64 and to inform the microprocessor 46 of the switch closures. A communication interface 108 (to be described later herein) couples the P Terminal 12 to the I Modules 14. The circuit 92 also includes conventional time, date, and calculator chip circuitry which are shown collectively as T.D.C. 81.

Figure 12:
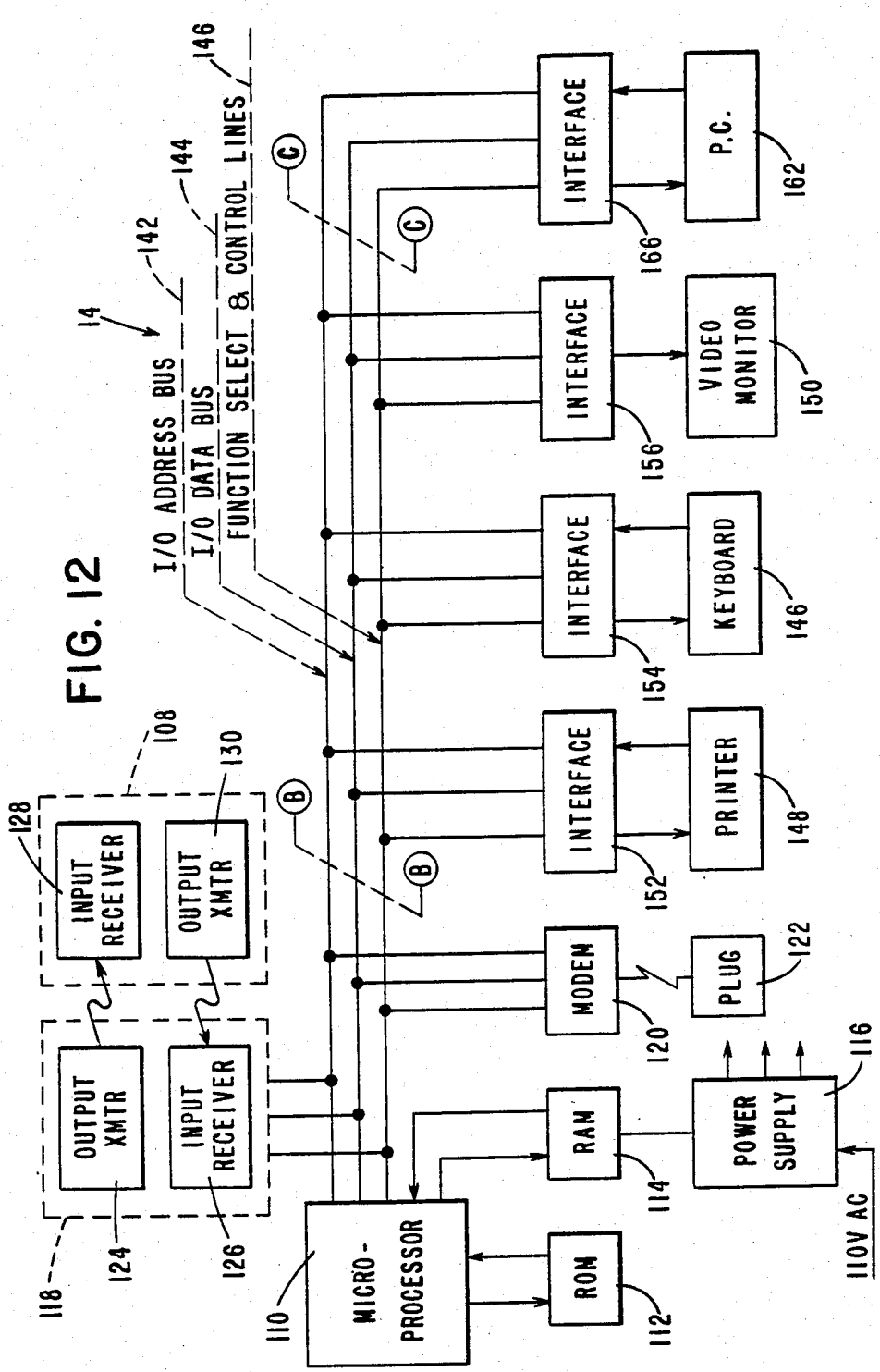
FIG. 12 is a schematic diagram, in block form, showing the components included in the interface module shown in FIG. 1.

The I Module 14, alluded to earlier herein, is shown in more detail in FIG. 12. The I Module 14 is modular in construction so as to adapt it to a particular environment in which it will be used. As a minimum, the I Module 14 includes the microprocessor 110, the ROM 112, the RAM 114, the power supply 116, the interface 118 which is coupled to the interface 108 associated with the circuit 92 of the P Terminal 12, and the MODEM 120. The power supply 116 is conventional in that it may be coupled to an outside source of 110 volts AC or it may be coupled to other terminals or systems 16 (FIG. 1) to obtain power therefrom; the power supply 116 is connected to the other elements shown by conventional connections (not shown). The ROM 112 contains the various control programs associated with the I Module 14, and in its simplest state, the ROM 112 contains the necessary control software to provide communication between the I Module 14 and the P Terminal 12 and to format the data for interfacing with the MODEM 120. The MODEM 120 has a plug 122 which connects to a telephone receptacle (not shown in FIG. 12) such that when the P Terminal 12 and the I Module 14 are coupled together (FIG. 2), the P Terminal 12 is enabled to communicate with other terminals or systems over the telephone lines.

The microprocessor 110 (FIG. 12) is coupled to the interface 108 of the P Terminal by the interface 118. In the embodiment described, the interfaces 108 and 118 are coupled together by light. This type of coupling eliminates critical alignment problems, is free of electrical noise which is usually associated with capacitive and low-level-signal reception, and permits minimum electrical energy to be required by the circuitry of the P Terminal 12. The interface 118 is comprised of an output transmitter (XMTR) 124 and an input receiver 126. The interface 108 includes an input receiver 128 which is aligned with the output XMTR 124, and correspondingly, the output XMTR 130 of the interface 108 on the P Terminal 12 is aligned with the input receiver 126 of the I Module 14.

Figure 13:
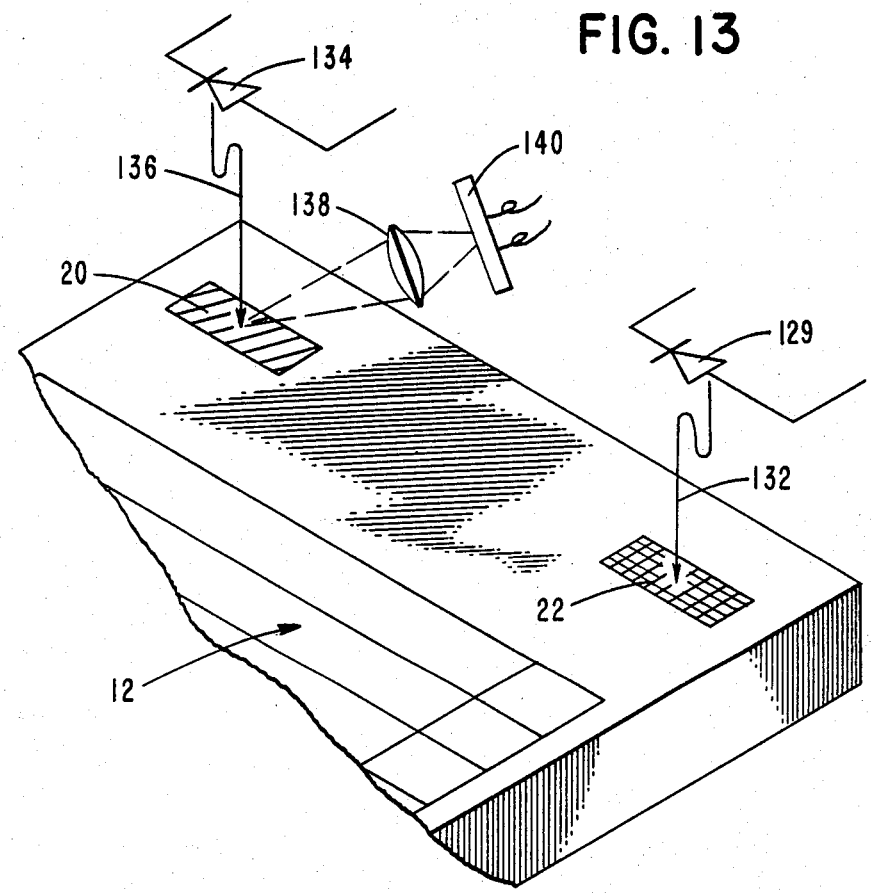
FIG. 13 is a schematic diagram showing the optical interface or coupling between the personal terminal and the associated interface module when they are in the assembled relationship shown in FIG. 2.

FIG. 13 is a schematic diagram showing the optical coupling between the P Terminal 12 and the I Module 14 when the two are positioned in the assembled relationship shown in FIG. 2. The output transmitter 124 (FIG. 12) of the I Module 14 includes the light emitting diode (LED) 129 which is used to direct modulated light as shown by arrow 132 (FIG. 13) on to the light detector area 22 associated with the P Terminal 12. Light from the LED 129 is modulated in accordance with the stream of data to be transferred from the I Module 14 to the P Terminal 12. The detector area 22 is part of the input receiver 128 (FIG. 12). The output XMTR 130 (FIG. 12) of the P Terminal 12 includes the light modulator area 20 (FIG. 13) already alluded to. The input receiver 126 (FIG. 12) of the I Module 14 includes the LED 134 which directs unmodulated light (as represented by arrow 136) on to the light modulator area 20 of the P Terminal 12. When the P Terminal 12 is to transmit data to the I Module 14, it energizes the light modulator area 20 in conformance with the data. A feature of the light coupling arrangement shown in FIG. 13 is that most of the energy for the coupling is supplied by the I Module 14. In this regard, the I Module 14 powers the LED 134 which directs unmodulated light to the area 20 on the P Terminal 12. An optical system shown as a lens 138 directs light reflected from the light modulator area 20 to a photodetector 140 which is part of the input receiver 126 located in the I Module 14. The light modulator area 20 contains liquid crystal material and may be fabricated as was the display 26 during the same manufacturing process; however, the area 20 is physically separate from the display 26. The substrate 70 (FIG. 7) which is part of the display 26 has a reflective metal layer (not shown) placed thereon in the area of the light modulator area 20 (FIG. 1). The area 20 contains a liquid crystal element which is modulated in accordance with the stream of data to be transmitted from the P Terminal 12 to the I Module 14. Accordingly, the reflected light received by the photodetector 140 will be modulated in accordance with the data to be transmitted from the P Terminal 12. If a higher throughput of data is required than the one just described, then the area 20 may be divided into a number of segments with a corresponding number of photodetectors, like 140, in the I Module 14; if the number of segments equals two, for example, data can then be transferred by the two units in a parallel-by-bit, serial-by-character format which will allow transfer rates to be higher than a purely, serial-by-bit format.

The light detector area 22 (FIG. 13) contains an array of thin-film transistors which serve as photosensors. All these transistors (not shown) may be connected in parallel to provide one output signal to the input receiver 128 of the P Terminal 12. All the light from the LED 129 striking the transistors in the area 22 thereby contributes to the detector signal, which is the electrical analogue of the modulated light from the LED 129 which transfers data from the I Module 14 to the P Terminal 12. Because of the inherent speed of the light-sensitive, thin-film transistors in the area 22, the data transfer from the I Module 14 to the P Terminal 12 can be effected by serial-by-bit, serial-by-character unless for reasons of consistency with the area 20, a parallel-by-bit, serial-by-character is chosen. As an alternate implementation, the areas 20 and 22 (FIG. 13) may consist of separate discrete elements which are attached to the P Terminal 12 instead of being manufactured with the process which produces the display 26. The top transparent layer 50 (FIG. 7) protects the areas 20 and 22. Additional details of the optical coupling shown in FIG. 13 may be found in copending application Ser. No. 618,001 which was filed on June 6, 1984 and which application is assigned to the same assignee as is this application.

Data is transferred among the different elements of the I Module 14 (FIG. 12) by the input/output (I/O)

address bus 142, the I/O data bus 144, and the function select and control lines 146 by conventional techniques. The I Module 14 also includes a conventional, light curtain 144 (FIG. 1) which forms a light seal between the I Module 14 and the P Terminal 12 to prevent stray light from affecting the transfer of data therebetween.

Having described the simplest embodiment of the I Module 14 shown in FIG. 12, it now appears appropriate to discuss additional embodiments of the I Module 14 which enable it and the P Terminal 12 to perform additional functions.

Figure 14:
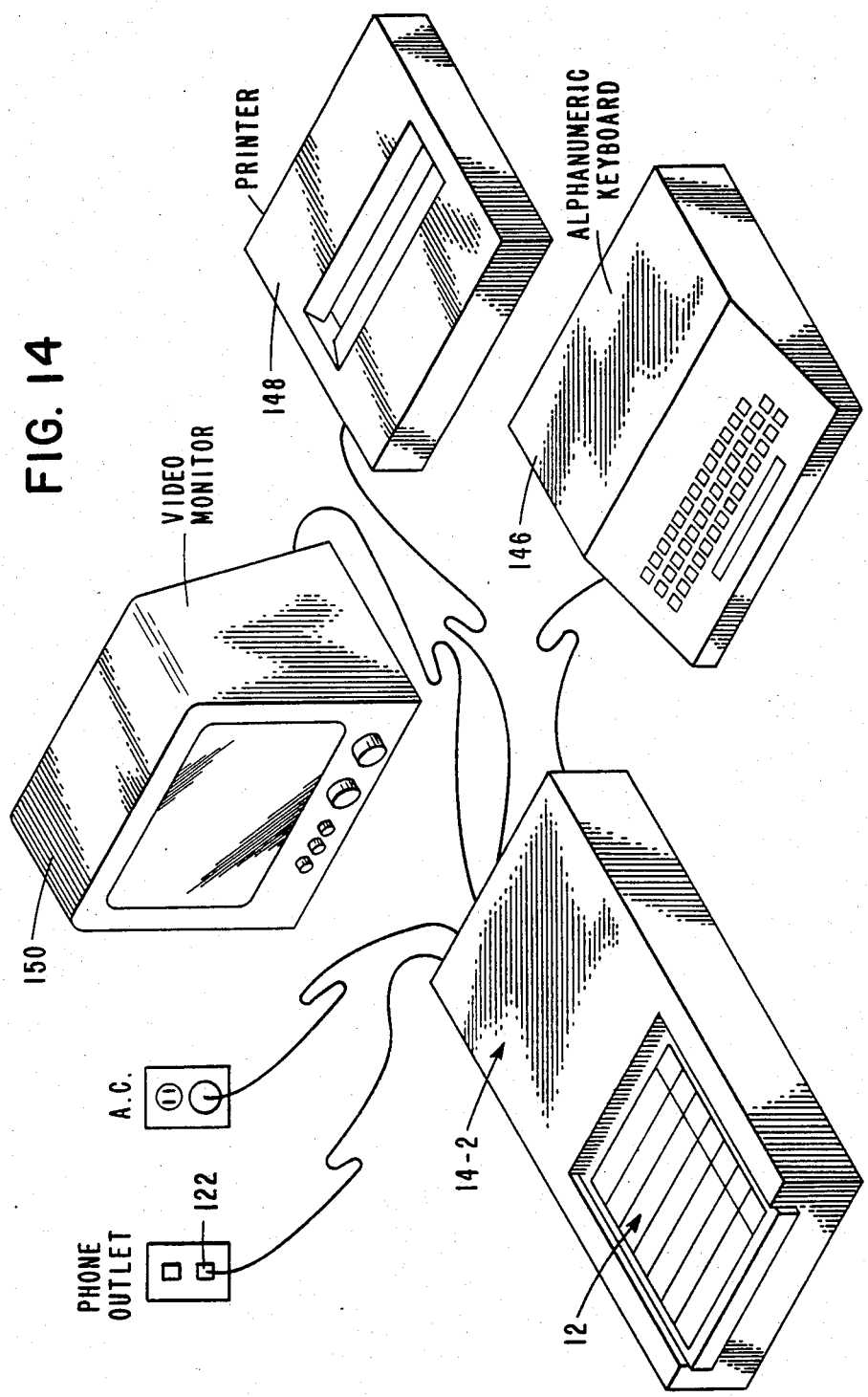
FIG. 14 is a schematic diagram, in perspective, showing a second modification of the interface module shown in FIG. 1.

The second embodiment of the I Module designated as 14-2 is shown in FIG. 14. This I Module 14-2 provides a home information system which includes an alphanumeric keyboard 146, a printer 148, and a video monitor 150 which are coupled to the I Module 14-2 as shown in FIGS. 14 and 12. The I Module 14-2 includes an interface 152 which couples the printer 148 to the busses 142 and 144 and the function select and control lines 146, and also includes the interfaces 154 and 156 which couple the keyboard 146 and video monitor 150, respectively to these busses and control lines. The interface 152 enables either serial or parallel printing by the printer 148. The interface 156 includes a character and graphics generator to provide the necessary signals to the video monitor 150, which could be a TV set in a low-cost environment. When the printer 148, keyboard 146, and video monitor 150 are to be added to the I Module 14-2, the associated application programs are included in the ROM 112 (FIG. 12). The elements which are included in the minimum configuration of the I Module 14 are shown to the left of line B—B in FIG. 12, while the configuration of the I Module 14-2 shown in FIG. 14 is shown to the left of line C—C in FIG. 12.

Figure 15:
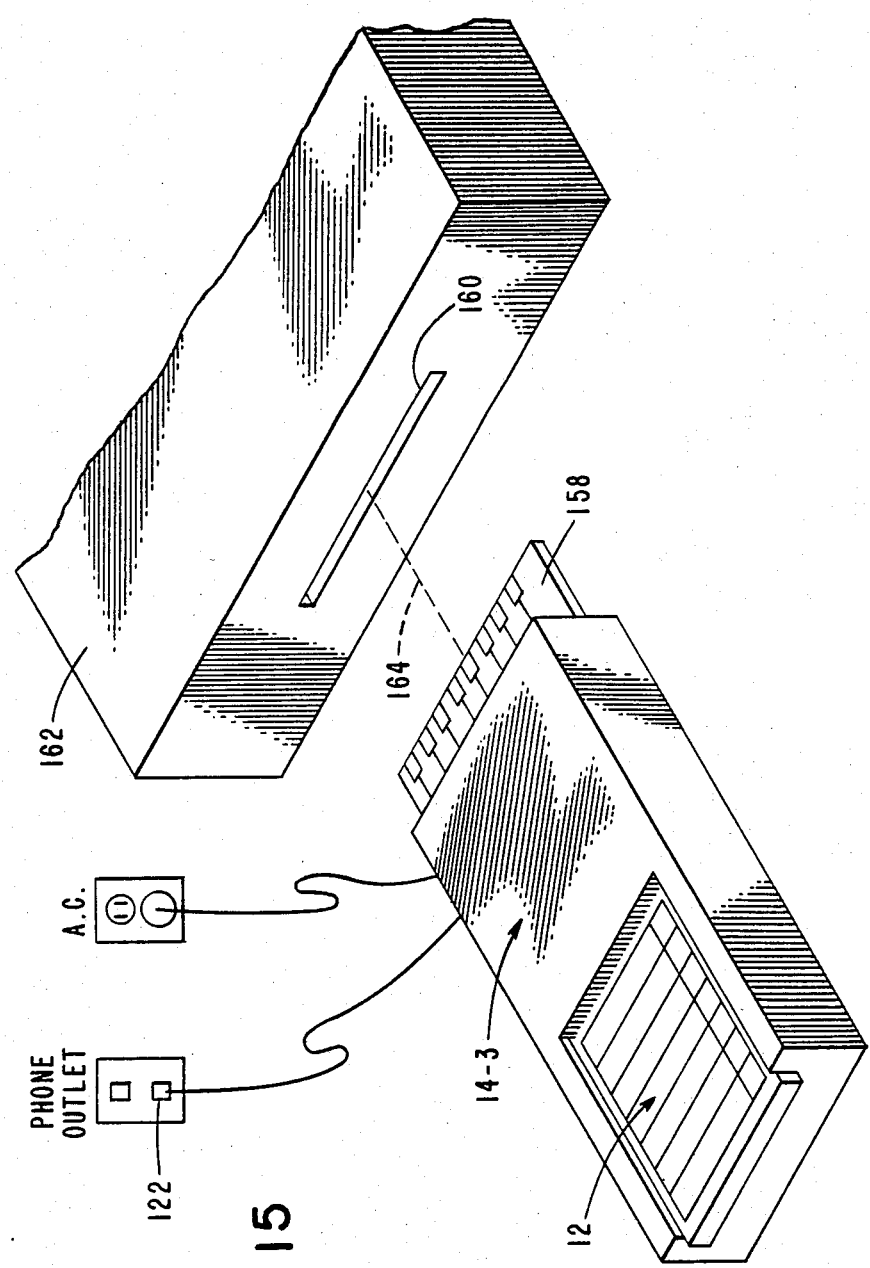
FIG. 15 is a schematic diagram, in perspective, of a third modification of the interface module shown in FIG. 1.

FIG. 15 shows a third modification of the I Module and it is designated generally as 14-3. The I Module 14-3 has an appropriate connector 158 which can be coupled directly into a matching connector 160 which is provided by the terminal 162. If the connector 160 is not conveniently located, a suitable connecting cable shown as dashed line 164 can be used to enable the I Module 14-3 to be conveniently operated with regard to the operating keyboard or controls (not shown) associated with the terminal 162. The terminal 162 (shown as P.C. in FIG. 12) may be a point of sale (POS) terminal such as an ATM, a gas dispensing terminal, a ticket dispensing terminal, or a personal computer (P.C.), for example. While the I Module 14 is shown as being separate from the terminal 162, it can be totally integrated into the terminal 162. For example, the I Module 14 may be constructed within the frame of an ATM to receive the P Terminal 12. The I Module 14-3 could also be connected to a phone outlet and an AC power outlet. The interface 166 (FIG. 12) connects the terminal 162 to the I Module 14-3. The form of the firmware/software associated with the microprocessor 110 is dependent upon the business machine or terminal 162 to which the I Module 14-3 is to be connected. From what has been described with regard to FIG. 12, it should be apparent that the I Module 14 has a wide range of capabilities in interfacing the P Terminal 12 with a variety of other terminals or Systems 16 as shown from FIGS. 12 and 1, for example.

Having described the P Terminal 12 and the I Module 14, it now appears appropriate to discuss how these two units are used in a typical transaction.

Assume that a user wishes to use the P Terminal 12 in a POS transaction such as paying for a grocery bill at a supermarket. In order to do so, the user actuates key area 28-6 (FIG. 3) to go to the main menu as previously described. While a POS transaction is not shown on the main menu shown in FIG. 4, the user would actuate key area like 28-9 in FIG. 4, to obtain the next menu (not shown) which might include several POS transactions. In another embodiment, the initial state of the P Terminal 12 might include the choice "Transact" (not shown), which after being selected, would include the transaction menus shown in FIGS. 16 and 17. The second "Transact" or transaction menu shown in FIG. 17 is presented after the key area 28-8 (FIG. 16) is actuated to request "more" of the menu. With the additional menu presented in FIG. 17, a user would actuate key 28-1 to select a standard point of sale (POS-STD) operation for paying for a grocery bill in the example being described. After the POS selection is made, the P Terminal 12 displays a message (not shown) requesting that the user insert his P Terminal 12 into the I Module 14 which is connected to the terminal 162 as shown in FIG. 15. As another mode of operation, the act of connecting the P Terminal 12 to the I Module 14 which is connected to the terminal 162 in FIG. 15 could cause the P Terminal 12 to display the transaction menu shown in FIG. 16 because, in this situation, payment of the bill is the expected reason for attaching the P Terminal 12 to the terminal 162. Naturally, the particular terminal 162 would have to be modified to cooperate with the I Module 14 in this regard.

Assume for the moment that the user actuated key area 28-1 in FIG. 17 to select a standard point of sale transaction in paying for the grocery bill in the example being described. The display on the P Terminal 12 would then instruct the user to install his P Terminal 12 in the I Module 14 as shown in FIG. 15. The I Module 14 is connected to the terminal 162 which may be a point of sale terminal like a "cash register". The terminal 162 may be an intelligent stand alone device, or it may be connected "on line" to a remote computer host (not shown), for example.

After the P Terminal 12 (FIG. 15) is coupled to the I Module 14 in the example being described, the P Terminal 12 requests that the user enter his personal identification number (PIN) as shown in FIG. 18. As the user enters his PIN, a dash (not shown) appears on line 26-2 in FIG. 18 for each number entered. A dash instead of the particular number of the PIN is shown for security reasons, and if the user is satisfied that he has entered his PIN properly, he actuates the key area 28-7 (FIG. 18) requesting that the PIN be entered. In the process of verifying the user of the P Terminal 12, a multi-digit number stored permanently within the P Terminal 12 but unknown to the user may also be used to identify this terminal and the various financial accounts associated with it and the user. The actual verifying of the P Terminal 12 and the user's PIN as valid may be done as shown in copending application Ser. No. 640,277 which was filed on Aug. 13, 1984 and which is assigned to the same assignee as is this invention, or a conventional verifying technique may be used. Assume that the PIN is accepted by the P Terminal 12 and the multi-digit number stored in the P Terminal 12 is accepted by the terminal 162 and/or its host system; in this situation, a message like that shown on line display 26-2 in FIG. 19 is displayed briefly. Thereafter, the messages and options are presented on the P Terminal 12 to the user as shown in FIG. 20. The amount of the sale $36.75 is obtained from the terminal 162 (FIG. 15) and is displayed on line display 26-3 (FIG. 20). Flexibility is provided by adjusting the charge as shown on line display 26-5 or cancelling the charge or transaction as shown on line display 26-6. Assume that the user accepts the charge; accordingly, the user then actuates the key area 28-4 which action then presents the displays and options shown in FIG. 21. Assume further that the user wishes to pay for the purchases from his checking account. In this situation, the user then actuates the key area 28-5 (FIG. 21) associated with "checking" shown on line display 26-5.

At this point in the processing of a transaction for the purchase of groceries, the user has indicated that he wishes to pay for the transaction from his checking account. As shown in FIG. 22, the P Terminal 12 indicates: the charge $36.75 on display line 26-2, his current checking balance of $342.15 on display line 26-3, and the balance which would remain in his checking account after this transaction is consummated as shown on display line 26-4. The P Terminal 12 carries the various balances associated with the user's various accounts and updates them to reflect transactions which he effects. If the user is satisfied with his intended payment, he actuates the key area 28-8 (FIG. 22) next to "ACCEPT" on line display 26-8 to effect the transaction. The transfer of funds from the user's account to that of the "Foodtown" store in the example described is effected immediately if the terminal 162 is on line with the host system or it may be done later if the terminal is not on line. The total of the user's checking account is also altered to reflect the recent payment of $36.75 in the example described so that the P Terminal 12 always carries his actual remaining balance. To assist the user in gaining confidence in the use of the P Terminal 12 and related systems, the P Terminal 12 exhibits the display shown in FIG. 23. The line displays 26-5 and 26-6 (FIG. 23) record the transaction for the history trail discussed earlier in relation to FIG. 5, and the line displays 26-7 through 26-9 (FIG. 23) request that the user remove his P Terminal 12 from the I Module 14 shown in FIG. 15.

While the P Terminal 12 has been described in relation to a POS transaction involving a grocery store, it is apparent that the techniques employed and described may be used to purchase gasoline at an automatic gasoline terminal or may be used with other POS terminals like those used for the purchase of tickets, for example.

Another feature of the P Terminal 12 is that it may be used with a terminal 162 which may be a personal computer (PC). The terminal 162 (PC) may be supplied with a program for handling "Home Payment" transactions, for example. With such a system, the terminal 162 (PC) may be connected to a host system via the telephone lines to provide the terminal 162 (PC) with the monthly bills to be paid by the user. Naturally, those companies wanting to be paid in this way would become part of the system for "Home Payment". The user would then use his P Terminal 12 in conjunction with the terminal 162 PC, and the user would operate the P Terminal 12 as described in relation to a POS transaction already described. If the terminal 162 (PC) did not have a MODEM, the MODEM associated with the P Terminal 12 (FIG. 15) could be used. For example, FIGS. 24, 25, and 26 show certain of the displays and options presented to the user from his P Terminal 12 when operating it in a "Home Pay" transaction. In this regard, the display 26 shows the amount of the payment to be made as $52.00 on display line 26-2 of FIG. 24; an earlier display (not shown) would have indicated that this payment was for Shillito Rike's Department Store. In the example described, assume that the user wishes to pay for this bill from his VISA account; accordingly, the user actuates the key area 28-6 (FIG. 24) which corresponds to "VISA" being displayed on display line 26-6.

After the "VISA" choice is made by actuating key area 28-6 (FIG. 24), the P Terminal provides the user with the format shown in FIG. 25. Line display 26-3 (FIG. 25) shows the user's current VISA balance for charges, and line display 26-4 shows how the user's balance will be increased by the intended purchase. If the user accepts this method of payment, he actuates key area 28-8 (FIG. 25) which completes the transaction. In this regard, the user's Shillito-Rike's charge balance will be decreased by $52.00 and his VISA charge balance will be increased by $52.00 through the "Home Pay" service in the example being described. These last transactions are also shown on display lines 26-4 and 26-5 of his P Terminal 12 as shown in FIG. 26; these lines provide the history trail previously discussed. Thereafter, the user can actuate the key area 28-8 in FIG. 26 to "Quit" the "Home Pay" service, and thereafter, the user will be instructed to remove his P Terminal 12.

While the "Home Pay" service has been described in conjunction with a terminal 162 (PC) (FIG. 15), the payment of bills can be effected without having the personal computer. Basically, the payment can be effected through using the P Terminal 12, and the I Module 14 which includes the configuration shown to the left of line B—B in FIG. 12, including the MODEM 120. In this situation, the initial mode of the P Terminal includes an option called "AUTO DIAL". When this option is selected, the P Terminal 12 and the I Module 14 become connected to the host system by the telephone lines. After verification of the user's PIN and account numbers as previously described, a menu such as that shown in FIG. 27 is presented to the user. Notice that display line 26-1 indicates that the P Terminal 12 and the I Module 14 are on an on line system with the host system and that the menu indicates a partial list of those companies which are part of the system for making home payment by electronic funds transfer. If the user wishes to pay his gas utility bill, he actuates the key area 28-6 (FIG. 27) to start the sequence of activities already explained in relation to FIGS. 20, 21, 22, and 23.

While the P Terminal 12 and the I Module 14 have been described in relation to financial transactions, the same techniques employed herein can be extended to use in office environments. Managerial, professional, and clerical employees can use the P Terminal 12 and the I Module 14 in conjunction with various types of office terminals and files in a controlled-access environment.

What is claimed is:
1. A data handling device comprising:
a panel;
a plurality of discrete display elements arranged relative to said panel to present, when selectively energized, user instructions and key information to a user of said device; said discrete display elements being small in size to enable said user instructions and key information to be presented over substantially all of said panel;
a plurality of discrete switches for entering data when actuated;

said discrete display elements and said discrete switches being positioned in overlapping relationship relative to said panel to enable said switches to be actuated from said panel;

control means for controlling the operation of said device including said discrete display elements and said discrete switches so as to facilitate the displaying and entry of data;

said control means comprising:

means for storing data and a plurality of machine instructions; and means for executing said machine instructions including means for selectively energizing said display elements so as to present on said panel that key information and those of said user instructions which are associated with those of said discrete switches which are to be used in association with said machine instructions being executed so as to present to said user a variable user instruction format and a variable key format which are a function of said machine instructions being executed as said machine instructions are executed so as to facilitate the entry of data; and said device also including means for transferring data between said device and a second data handling device.

2. The device as claimed in claim 1 in which said storing means includes means for storing more than one financial account total associated with said user of said device.

3. The device as claimed in claim 2 in which said storing means includes means for storing a plurality of application programs which can be selected to be run by said user of said device.

4. The device as claimed in claim 3 in which said device is portable and is of a size enabling said device to be held in said user's hand.

5. The device as claimed in claim 4 in which said storing means includes a personal identification number associated with said user of said device, and said control means also includes means for determining whether or not a user of said device is a valid user thereof in response to a personal identification number entered on said discrete switches by said user.

6. The device as claimed in claim 5 in which said storing means also includes identification data which is used to identify said device as a valid device when said device is used in connection with said second data handling device, and in which said executing means includes a microprocessor.

7. The device as claimed in claim 6 in which said transferring means comprises:

a sensor area for receiving data from said second data handling device; and a transmitting area for transmitting data from said data handling device to said second data handling device;

said sensor and transmitting areas being light-operated.

8. The device as claimed in claim 7 in which said sensor and transmitting areas are located on said panel.

9. The device as claimed in claim 5 in which at least one of said application programs enables a said valid user of said device to access a selected said financial account total and display it via said display elements.

10. The device as claimed in claim 9 in which said control means also includes means for indicating time and date data in association with at least one of said application programs so as to provide a chronological history of transactions effected on said device.

11. The device as claimed in claim 10 which said control means includes a battery for supplying power to said device.

12. The device as claimed in claim 1 in which said plurality of discrete switches is arranged in a matrix of switches which matrix extends over substantially all of said panel.

13. The device as claimed in claim 12 in which said panel has an outside surface and in which said matrix of switches is of the micromotion type and also is transparent; said matrix of switches being located between said discrete display elements and the outside surface of said panel.

14. The device as claimed in claim 1 in which said discrete display elements are of the liquid crystal type.

15. The device as claimed in claim 14 in which said device also includes a first substrate, a second substrate which are spaced apart in parallel relationship.

16. A portable, intelligent, data handling device comprising:

means for storing data and machine instructions;

means for executing said machine instructions;

a panel;

means for displaying data to a user of said device;

means for entering data on said device;

said displaying means and said entering means being in overlapping relationship relative to said panel and extending over substantially all of said panel;

said executing means including means for energizing said displaying means so as to present on said displaying means a variable key format and a variable user instruction format which are a function of said machine instructions being executed as said machine instructions are executed so as to facilitate the entry of data; and said device also including light coupling means for transferring data between said device and a second data handling device.

17. The device as claimed in claim 16 in which said device is of a size substantially equal to that of a credit card, and in which said light coupling means includes a light receiving area and a light transmitting area located on one end of said panel.

* * * * *